United States Patent [19]

Brogna

[11] 4,411,880

[45] Oct. 25, 1983

[54] PROCESS FOR DISPOSING OF CARBON FIBERS

[75] Inventor: Christopher B. Brogna, Maplewood, N.J.

[73] Assignee: Celanese Corporation, New York, N.Y.

[21] Appl. No.: 378,980

[22] Filed: May 17, 1982

[51] Int. Cl.³ .................. D01F 11/10; D01F 13/00
[52] U.S. Cl. ............................ 423/659; 423/460
[58] Field of Search .............. 423/447.1, 460, 659; 134/25.1; 427/307; 8/115.5

[56] References Cited

U.S. PATENT DOCUMENTS

| | | |
|---|---|---|
| 3,347,632 | 10/1967 | Parker |
| 3,746,560 | 7/1973 | Goan et al. |
| 3,859,187 | 7/1975 | Druin et al. ................. 134/25 R |
| 3,894,884 | 1/1975 | Druin et al. ................. 204/130 |

FOREIGN PATENT DOCUMENTS

| | | |
|---|---|---|
| 2048916 | 4/1971 | Fed. Rep. of Germany |
| 2112455 | 10/1971 | Fed. Rep. of Germany |
| 1238308 | 7/1971 | United Kingdom |
| 1257022 | 12/1971 | United Kingdom |
| 2065707 | 7/1979 | United Kingdom |

OTHER PUBLICATIONS

Werking, *Chemical Engineering*, V. 54, No. 2 (1947) pp. 219–234.

*Primary Examiner*—O. R. Vertiz
*Assistant Examiner*—Steven Capella
*Attorney, Agent, or Firm*—Herbert P. Price

[57] ABSTRACT

A simple and efficient process is provided for disposing of easily airborne carbon fibers by subjecting them to an aqueous solution of an alkali metal or alkaline earth metal hypohalogenite at an elevated temperature for a period of time sufficient to substantially destroy the fibrous configuration of said fibers. In a preferred embodiment, carbon fibers are contacted with a solution of sodium hypochlorite (approximately 5 to 6 percent active chlorine concentration by weight based on the weight of the solution) at a temperature of between about 50° and about 60° C. for between about 1 and about 12 hours.

6 Claims, No Drawings

PROCESS FOR DISPOSING OF CARBON FIBERS

BACKGROUND OF THE INVENTION

This invention relates to a process for disposing of waste carbon fibers in an economical and relatively safe manner.

In the search for high performance materials, considerable interest has been focused upon carbon fibers. Industrial high performance materials of the future are projected to make substantial utilization of fiber reinforced composites, and carbon fibers theoretically have among the best properties of any fiber for use as a high strength reinforcement. Among these desirable properties are corrosion- and high temperature-resistance, low density, high tensile strength, and high modulus. Graphite is one of the very few known materials whose tensile strength increases with temperature. Uses for carbon fiber reinforced composites include recreational equipment, aerospace structural components, rocket motor casings, deep-submergence vessels, and ablative materials for heat shields on re-entry vehicles.

While these fibers are relatively safe in their intact form, and particularly so if they are embedded in a resin, disposing of carbon fibers is a problem. When disintegrated as by incineration very fine, lightweight fibers may result, and, due to their small size, are readily released into the environment. These airborne fibers may pose an electrical hazard and may cause shorts or arcing in electrical equipment, and subsequent power failures or fires.

British Patent Application No. 2065707A relates to a process for facilitating safe incineration of carbon fibers wherein the fibers are treated by electrocoating or electrodeposition of materials such as phosphorous compounds, titanates, polyimides, polyquinoxalines, nitriles, or boric acid. This process imparts a high electrical resistance to the carbon fibers. However, this process of course requires a pre-treatment which may be costly and time consuming, and may also hinder the compatibility of the fibers with a resinous matrix.

U.S. Pat. Nos. 3,859,187 and 3,894,884, and British Pat. Nos. 1,238,308 and 1,257,022, and German Offenlegungsschrift No. 2,048,916 disclose surface modification of carbon fibers by use of a sodium hypochlorite solution. However, this treatment is intended to facilitate enhanced adhesion between the intact fiber and a resinous matrix. For example, U.S. Pat. No. 3,894,884 to Druin et al. discloses treatment of carbon fibers for about 1 to 60 minutes with an aqueous solution of sodium hypochlorite at a concentration of about 3 to 7 percent by weight active chlorine, at a temperature of between 20° and 35° C., to effect improved fiber-resin adhesion.

It is an object of this invention to provide a method for safely disposing of carbon fibers.

It is a further object of this invention to provide a method for disposing of carbon fibers which is relatively rapid and inexpensive.

It is a further object of the invention to provide a method for disposing of carbon fibers which is simple and requires no pre-treatment of the fibers.

These and other objects, as well as the scope, nature, and utilization of the invention will be apparent from the following detailed description and appended claims.

SUMMARY OF THE INVENTION

It has been found that a process for disposing of carbon fibers comprises subjecting said fibers to an aqueous solution of a metal hypohalogenite wherein the metal is selected from the group consisting of alkali metals, alkaline earth metals, and mixtures of the foregoing, at an elevated temperature for a period of time sufficient to substantially destroy the fibrous configuration of said fibers.

DESCRIPTION OF THE PREFERRED EMBODIMENTS

The Starting Materials

The fibers which are disposed of in accordance with the present process are carbonaceous and contain at least about 90 percent carbon by weight. Such carbon fibers may exhibit either an amorphous carbon or a predominantly graphitic carbon x-ray diffraction pattern.

The carbon fibers which are disposed of may be prepared by any of the methods known to one skilled in the art (e.g., U.S. Pat. No. 3,894,884, Druin et al, herein incorporated by reference). The fibers may be of high or low modulus and in any physical configuration (e.g., multifilament yarn, tape, tow, strand, cable). Suitable organic polymeric fibrous materials from which the fibrous material capable of undergoing carbonization may be derived include an acrylic polymer, a cellulosic polymer, a polyamide, a polybenzimidazole, polyvinyl alcohol, etc. Acrylic polymeric materials are particularly suited for use as precursors in the formation of carbonaceous fibrous materials. Illustrative examples of suitable cellulosic materials include the natural and regenerated forms of cellulose, e.g., rayon. Illustrative examples of suitable polyamide materials include the aromatic polyamides, such as nylon 6T, which is formed by the condensation of hexamethylenediamine and terephthalic acid. An illustrative example of a suitable polybenzimidazole is poly-2,2'-m-phenylene-5,5'-bibenzimidazole.

A fibrous acrylic polymeric material prior to stabilization may be formed primarily of recurring acrylonitrile units. For instance, the acrylic polymer should contain not less than about 85 mole percent of recurring acrylonitrile units with not more than about 15 mole percent of a monovinyl compound which is copolymerizable with acrylonitrile such as styrene, methyl acrylate, methyl methacrylate, vinyl acetate, vinyl chloride, vinylidene chloride, vinyl pyridine, and the like, or a plurality of such monovinyl compounds.

These starting materials may be carbonized or graphitized by any method known to one skilled in the art (see above-identified patent to Druin et al).

THE OXIDIZING PROCESS

The carbon fibers are contacted with an aqueous solution of an alkali metal or alkaline earth metal hypohalogenite or mixtures thereof (as described in detail hereinafter) at an elevated temperature for a period of time sufficient to substantially destroy the fibrous configuration of the fibers.

The alkali metal or alkaline earth metal hypohalogenite is of the formula MeOX, wherein "Me" represents one of the following alkali metals or alkaline earth metals: lithium, sodium, potassium, magnesium, calcium or barium; "O" is oxygen, and "X" represents one of the following halogens: chlorine, bromine or iodine. Examples of suitable alkali metal or alkaline earth metal hypohalogenites include potassium hypochlorite (KOCl), potassium hypobromite (KOBr), sodium hypochlorite (NaOCl), sodium hypobromite (NaOBr), magnesium hypochlorite ($Mg(OCl)_2$), calcium hypochlorite ($Ca(OCl)_2$), and barium hypochlorite ($Ba(OCl)_2$). The particularly preferred alkali metal or alkaline earth metal hypohalogenite is sodium hypochlorite.

The solution of the alkali metal or alkaline earth metal hypohalogenite or mixture thereof of the present invention is aqueous; the preferred concentration of the hypohalogenite is between about 3 and about 30 percent active halogen concentration (i.e., available halogen concentration) based on the weight of the solution.

The active halogen concentration (i.e., concentration of the chemically active species, the halogen gas available from a solution of a hypohalogenite) for a given solution of an alkali metal or alkaline earth metal hypohalogenite or mixture thereof may be determined by adding KI and determining excess iodine by titrating with sodium thiosulfate. One of ordinary skill in the art could readily determine the amount of pure halogenite corresponding to the specified active halogen concentration to produce a solution of desired concentration.

In a preferred embodiment, an active halogen concentration of between about 5 and about 6 percent by weight based on the weight of the solution is used. In a most preferred embodiment, the concentration is about 5.25 percent by weight based on the weight of the solution, and the active halogen concentration is monitored, and alkali metal or alkaline earth metal hypohalogenite replenished to maintain the desired concentration.

In a preferred embodiment, the aqueous solution of the alkali metal or alkaline earth metal hypohalogenite or mixture thereof comprises a small percentage (0.4 percent) of an alkali metal hydroxide (e.g., sodium hydroxide) or acid (e.g., hydrochloric or hydrobromic acid) to maintain pH stability at between pH 8 and 12, and preferably at about pH 11.

The solution is preferably provided at a temperature of between about 50° C. and about 150° C.; and in a particularly preferred embodiment, the solution is provided at between about 50° and 60° C. Further, as will become apparent in the Examples which follow, much more time is required to effect the complete decomposition of the fibers in an aqueous sodium hypochlorite solution at room temperature relative to elevated temperatures. To attain temperatures above about 100° C., it is necessary that the vessel be pessurized. The solution in the vessel is maintained at a pressure of between about one and six atmospheres (depending on the temperature of the solution), and preferably at approximately atmospheric pressure.

In a most preferred embodiment sodium hypochlorite at a pH of approximately 11 and an active chlorine concentration of about 5.25 percent by weight based upon the weight of the solution is employed. Commercially available liquid bleach meeting the above prerequisites may be selected for use in the present process, and is sometimes designated as soda bleach liquor or household bleach solution (e.g., "Clorox", available from Clorox Co.). Such a solution may be formed, inter alia, by passage of chlorine through a dilute caustic soda solution in either a batch or continuous operation in accordance with techniques known in the art.

The contact between the carbon fibers and the aqueous solution of an alkali metal or alkaline earth metal hypohalogenite or mixture thereof may be accomplished in any convenient manner. In a preferred embodiment of the process, the carbon fibers are packed into a glass-lined vessel which is equipped with an appropriate pressure-release valve. Additionally, in the preferred embodiment, the vessel contains a device suitable or automatically monitoring the concentration of alkali metal or alkaline earth metal hypohalogenite in the vessel as a function of the active halogen present. Alternately, samples of the aqueous solution of the alkali metal or alkaline earth metal hypochlorite may be taken from the vessel and titrated in the manner described above, to determine the active halogen concentration. In the preferred embodiment, sodium hypochlorite may be replenished when the concentration thereof falls below a critical value, to be further discussed in the Examples which follow.

The residence time (i.e., amount of time carbon fibers are in contact with the alkali metal hypohalogenite solution) for complete destruction of the fibrous configuration varies, as will become apparent in the Examples which follows, with respect to other parameters. For instance, an increase in temperature or in concentration allows for complete destruction with decreased residence time. Thus, maintaining the desired active halogen concentration by monitoring the concentration of and replenishing the alkali metal or alkaline earth metal hypohalogenite or mixture thereof allows for decreased residence time.

The process of the present invention surprisingly results in complete destruction of the fibrous configuration of the carbon fibers, thus eliminating the electrical hazard which possibly could result if very small fibers become airborne, as upon incineration.

The following examples are given as specific illustrations of the invention. It should be understood, however, that the invention is not limited to the specific details set forth in the Examples.

EXAMPLE I

Approximately 0.1 g. of a high strength-low modulus mat, consisting of paper formed from short lengths of carbon fibers of about ¼ to ½ inches joined by a binder, having a density of 0.3 oz/yd² (commercially available from International Paper Co., Tuxedo Park, N.Y.) is placed in a glass-lined vessel containing about 100 ml of aqueous sodium hypochlorite ("Clorox") of 5.25 percent by weight active chlorine concentration based on the weight of the solution. The solution is supplied at a temperature of approx. 80° C., and a pH of 11. The vessel contains a pressure-release valve such that chlorine gas evolved can be vented. Pressure is thus maintained at approximately one atmosphere. Concentration of sodium hypochlorite is monitored by periodically removing samples and then titrating those samples and adding sodium hypochlorite solution on an "as needed basis" to maintain the concentration at about 4 to 7 percent. Temperature of the solution maintained between about 50° to 60° C., and pH at about 11. Analysis of the remains of the fibrous material being treated is made, and the following values attained:

| hours | Percent Weight Loss |
|---|---|
| 0 | 0 |
| 3 | 30 |
| 7 | 72 |
| 12 | 100 |

The residue in the flask was found to consist of white crystals.

EXAMPLE II

Approximately 0.1 g of the high strength-low modulus mat used in Example I was placed in a flask containing about 100 ml of 5.25 percent aqueous NaOCl solution ("Clorox"). The flask was placed in an a forced air oven at 90° C. Additional sodium hypochlorite solution was added to maintain the volume of the solution at approximately 100 ml, but no effort was made to preserve the initial concentration as in Example I. Weight loss (%) of the carbon fiber was observed after the following times:

| Days | Percent Weight Loss |
| --- | --- |
| 7 | 43 |
| 10 | 63 |
| 11 | 100 |

COMPARATIVE EXAMPLE

Example II was substantially repeated with the exception that 1% sodium hydroxide solution was added instead of NaOCl solution, and distilled water added as needed (to maintain a volume of 100 ml). After 12 days, a weight loss of only 22% was observed.

EXAMPLE III

Example II was substantially repeated, except that after 5 days the flask was replenished with 100 ml of fresh Clorox solution. Two days later the weight loss (%) of the carbon fiber mat was 100%. Over the same period of time weight loss was 43% for a sample which did not have the Clorox solution replenished.

Although the invention has been described with preferred embodiments, it is to be understood that variations and modifications may be resorted to as will be apparent to those skilled in the art. Such variations are to be considered within the purview and scope of the claims appended hereto.

I claim:

1. A process for disposing of carbon fibers comprising subjecting said fibers to an aqueous solution of a metal hypohalogenite wherein the metal is selected from the group consisting of alkali metals, alkaline earth metals, and mixtures of the foregoing, at an elevated temperature for a period of time sufficient to substantially destroy the fibrous configuration of said fibers wherein the concentration of said metal hypohalogenite is provided in said solution in an amount sufficient to produce between about 3 and about 30 percent by weight active halogen based on the weight of the solution, wherein said aqueous solution is provided at a temperature between about 50° C. and about 150° C. and wherein said process is performed at a pressure of between about 1 atmosphere and about 6 atmospheres.

2. A process for disposing of carbon fibers comprising subjecting said fibers to an aqueous solution of sodium hypochlorite at an elevated temperature for a period of time sufficient to substantially destroy the fibrous configuration of said fibers wherein the concentration of said sodium hypochlorite is provided in said solution in an amount sufficient to produce between about 3 and about 30 percent by weight active chlorine based on the weight of the solution, wherein said aqueous solution is provided at a temperature between about 50° C. and about 150° C. and wherein said process is performed at a pressure of between about 1 atmosphere and about 6 atmospheres.

3. The process of claim 2, wherein said aqueous solution is provided at a temperature between about 50° C. and about 60° C.

4. The process of claim 2, wherein said fibers are in contact with said solution for between about one and about twelve hours.

5. A process for disposing of carbon fibers comprising contacting said fibers with an aqueous solution of sodium hypochlorite wherein said sodium hypochlorite is provided in said solution in an amount sufficient to produce between about 3 and about 30 percent active chlorine by weight based upon the weight of the solution, monitoring the concentration of active chlorine in said solution, replenishing the amount of sodium hypochlorite in said solution so as to maintain the active chlorine concentration within said range while said solution is in contact with said carbon fibers, and maintaining said carbon fibers in said solution until the fibrous configuration of same is substantially destroyed.

6. The process of claim 5, wherein said sodium hypochlorite is provided in said solution in an amount sufficient to produce about 5 to 6 percent active chlorine by weight based upon the weight of the solution.

* * * * *